United States Patent [19]

Lapeyronnie

[11] 3,905,347

[45] Sept. 16, 1975

[54] ELECTRONIC IGNITION DEVICE FOR INTERNAL COMBUSTION ENGINES

[75] Inventor: Andre Gabriel Lapeyronnie, Paris, France

[73] Assignee: FIME, France

[22] Filed: Oct. 16, 1972

[21] Appl. No.: 298,025

[30] Foreign Application Priority Data
Oct. 14, 1971  France .............................. 71.36966

[52] U.S. Cl. .............................. 123/148 E; 315/209
[51] Int. Cl. .............................................. F02p 1/00
[58] Field of Search .................................. 123/148 E

[56] References Cited
UNITED STATES PATENTS

| | | | |
|---|---|---|---|
| 3,418,989 | 12/1968 | Silverman........................ | 123/148 E |
| 3,517,260 | 6/1970 | Oishi................................ | 123/117 R |
| 3,612,011 | 10/1971 | Monpetit.......................... | 123/148 E |
| 3,621,826 | 11/1971 | Chrestensen.................... | 123/148 E |
| 3,718,126 | 2/1973 | Oishi................................ | 123/117 R |
| 3,722,489 | 3/1973 | Howard........................... | 123/148 E |
| 3,738,339 | 6/1973 | Huntzinger...................... | 123/148 E |
| 3,741,176 | 6/1973 | Schmidt.......................... | 123/148 E |
| 3,749,070 | 7/1973 | Oishi................................ | 123/117 R |
| 3,757,755 | 9/1973 | Carner............................. | 123/117 R |

*Primary Examiner*—Manuel A. Antonakas
*Assistant Examiner*—Joseph Cangelosi
*Attorney, Agent, or Firm*—Steinberg & Blake

[57] ABSTRACT

Electronic device for the ignition of an internal combustion engine, comprising an electronic breaker device supplying rectangular impulses, the frequency of which depends upon the rotary speed of the engine, an electronic device for adjusting the ignition, and an electronic circuit for the distribution of current to each cylinder of the engine.

22 Claims, 15 Drawing Figures

ELECTRONIC IGNITION DEVICE FOR INTERNAL COMBUSTION ENGINES

The present invention relates to an electronic ignition device for internal combustion engines, of the type comprising a certain number of mechanical elements and/or electrical elements, intended to produce sparks or arcs between the electrode of the plugs placed in the cylinders of an internal combustion engine.

The conventional and known ignition according to the prior art is a mechanical control ignition, comprising a mechanical breaker moved by a cam, a coil for converting the low-voltage current of the storage battery into high-voltage current intended for the electrodes of the plugs, a mechanical distributor such as a rotating stud which distributes the high-voltage current to the various plugs of the engine, and ignition advance adjustment devices, such as centrifugal weight devices and depression devices. In general, the cam of the breaker and the rotating stud of the distributor are mounted on a shaft, the rotary speed of which depends upon that of the engine. Such mechanical controls have a certain number of drawbacks and, in particular, lack accuracy and rapidity. Moreover, they wear rather rapidly and are not compatible with high speeds of motor rotation, such as those used generally in high efficiency or elaborate engines, and, in addition, absorb an important part of the energy.

There are also known, according to the prior art, a few ignition devices with partially electronic control, generally of the single-impulse or the multi-impulse type. In both these cases, a small portion of the stored energy is used for producing sparks between the electrodes of the plugs, and their efficiency is rather low.

In order to remedy all the aforesaid drawbacks, the invention proposes an electronic ignition device for an internal combustion engine, comprising at least one breaker, the opening and closing frequency of which depends upon the rotary speed of the engine, a coil for converting the low-voltage current into high-voltage current, and a distributor for dispensing the high voltage to the plugs of the engine, the said device being characterized in that it comprises at least one electronic device for cutting off the primary circuit of the coil, mounted between the breaker and the said coil, and permitting a good shaping of the electric impulses supplied by the said breaker.

According to another feature of the invention, the said cutoff device is controlled by a univibrator circuit mounted immediately after the breaker.

According to another feature of the invention, the said breaker is an electronic circuit comprising a sensing element, such as a phototransistor, and a Schmitt trigger delivering calibrated rectangular impulses at a frequency depending upon the rotary speed of the engine.

According to other features of the invention, the ignition device comprises electronic circuits for the adjustment of ignition advance and for the distribution of current to each cylinder of the engine.

The invention therefore enables either entirely electronic or partially mechanical and partially electronic ignition devices to be obtained. Such devices have an excellent efficiency and consume very little energy, and are also capable of operation at very high rotary speeds of the engine.

The invention will be better understood and other purposes, features and advantages of the latter will appear as the following explanatory description proceeds with reference to the appended diagrammatic drawings given solely by way of example illustrating various forms of embodiment of the invention and wherein:

FIGS. 8 A-B, the terminals X, Y of which must be respectively connected, show the general circuit diagram of an advance adjustment device according to the invention;

FIGS. 10 A-B-C are graphs showing various impulses intervening in the operation of the device of FIG. 8;

Figure 1:
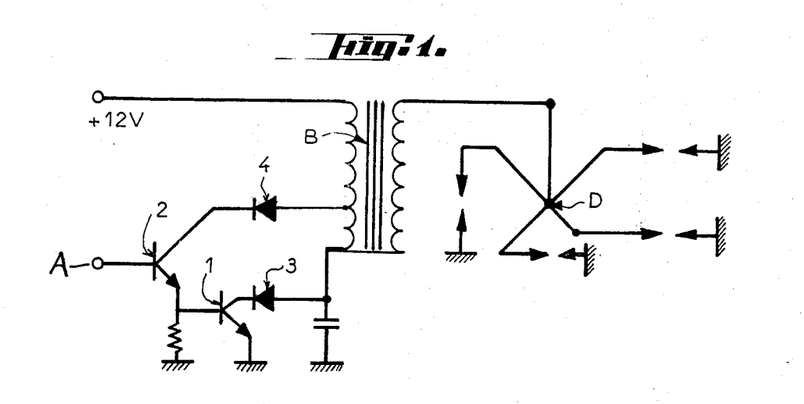
FIG. 1 is a partial view of a device according to the invention.

FIG. 1 therefore shows a circuit for processing the impulses supplied at an input terminal A by the breaker, associated with a coil B and a mechanical distributor D for dispensing high-voltage current to the plugs of the engine. This circuit comprises a power transistor 1 and a pilot transistor 2, the collectors of which are connected to the primary winding of the coil through the medium of diodes 3 and 4. Diode 3 is mounted at the end of the primary winding, whereas diode 4 is mounted on about one tenth of the said primary winding.

The transistor 1 is saturated or non-conductive according to whether the breaker is closed or open. When the transistor is non-conductive, the high voltage obtained has the aspect of an attenuated or damped sine-curve, and the diode 3 fulfills, with the transistor 1, the function of a perfect cut-off. This arrangement notably enables the cut-off time of the coil circuit to be improved and the energy lost in the mechanical breaker to be avoided.

Figure 2:
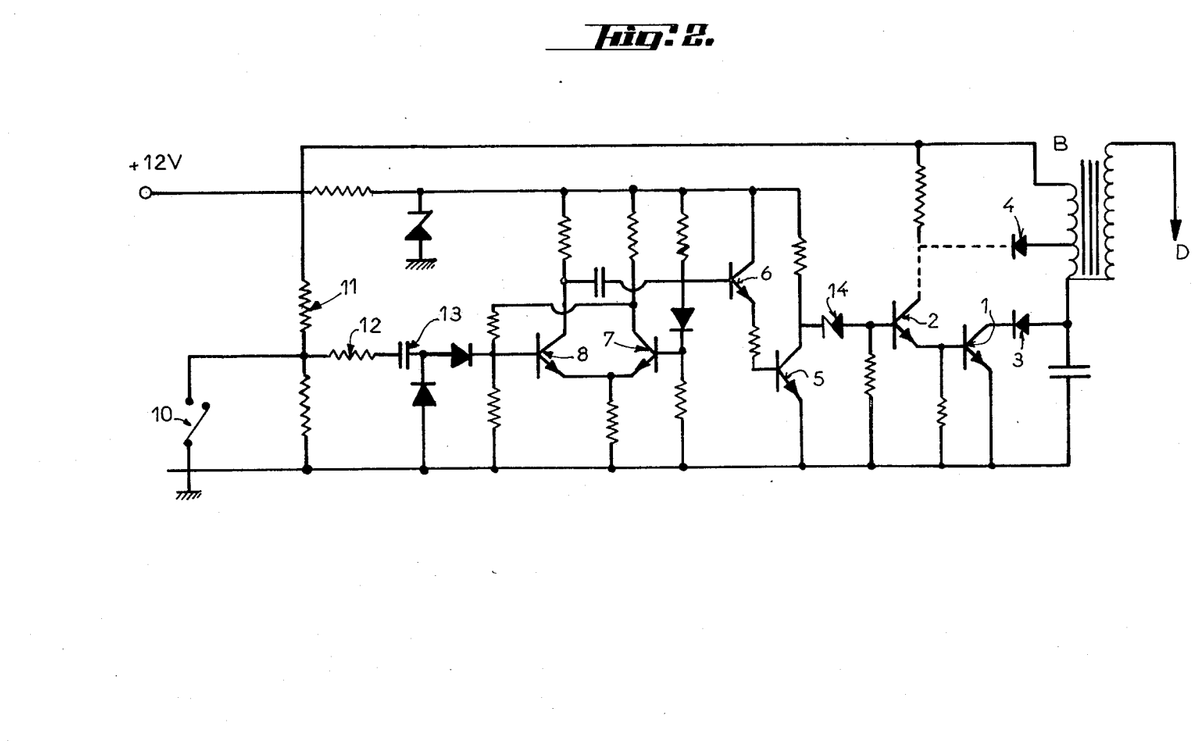
FIG. 2 is a circuit diagram of an embodiment of the invention complementary to that shown in FIG. 1.

The circuit just described is readily controlled by a mechanical breaker through the medium of a univibrator, according to the circuit diagram shown in FIG. 2.

The univibrator circuit, comprising the transistors 7 and 8 arranged in a conventional manner, calibrates the duration of the impulses produced by the opening and the closing of the breaker 10. The resistance 11 must have a low value in order that the rise time of the univibrator trigger signal should be sufficiently small and produce a minimum current in the breaker 10, the contact resistance of the breaker depending upon the current passing therethrough. The resistance 12 limits the discharge current of the capacitor 13.

The maximum duration of the univibrator is one millisecond, thus permitting of a complete discharge of the coil B and still leaving a period of four milliseconds at 6,000 revolutions per minute of a four cylinder engine for charging the coil.

An important advantage of this device is that the duration of ignition does not depend upon the spacing of the platinum-tipped screws of the conventional mechanical distributor. Moreover, the Zener diode 14 enables the transistor 2 to be perfectly rendered nonconductive, even if the saturation voltage of transistor 5 is not very low. Lastly, although the feed voltage is adjusted at 9 volts by the diode 3 in order to prevent interferences and voltage fluctuations, the whole assembly, which is designed to operate at 12 volts, retains its performances at from 6 volts to 15 volts at temperatures varying from −20° to +80°C.

It should also be noted that the diode 4 may be done away with and replaced by a resistance mounted between the collector of transistor 2 and the low-voltage supply of the coil.

In the device just described, the current flowing through the breaker is very small and cuts a resistive circuit, thus fulfilling only the function of a synchronizer. However, part of the drawbacks involved in a breaker subsists, i.e., the uncertainty of the ignition point, the bounce of the breaker, the racing at a high rotary speed. In order to avoid these drawbacks, the invention proposes an electronic synchronizing device intended to replace the conventional mechanical breaker.

Figure 3:
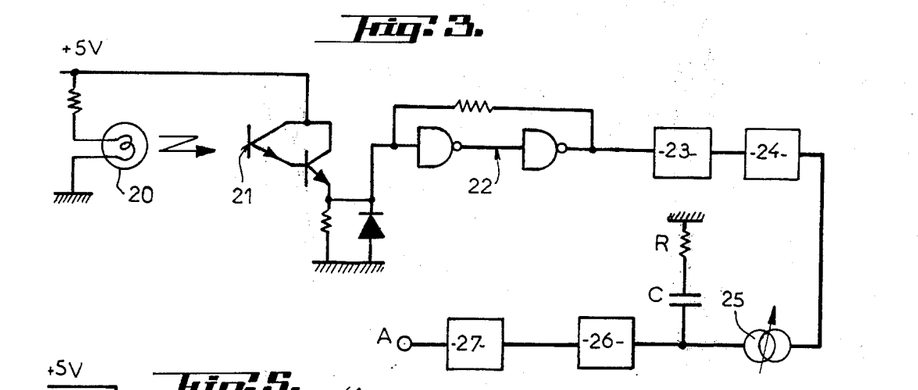
FIG. 3 is a diagrammatic view of another embodiment of the invention.

The said device, illustrated in particular in FIG. 3, comprises a sensing element associated with a Schmitt trigger, permitting a good shaping of the impulses delivered by the sensing element. According to the invention the sensing element used is a phototransistor, for instance of the type BPX 45, the most interesting features of which are:

detection in near infra-red and visible spectrum,
  important gain (nominal gain = 5,000),
  power equal to 400 milliwatts,
  reduced overall dimensions,
  compatibility of response time,
  colourless magnifier imparting to it a good directivity,
  operating temperature from −65° to +125°C.

According to one form of embodiment of the invention, the phototransistor is illuminated through an opening provided in a disk coupled on the shaft driving the conventional mechanical distributor by a 5-volt lamp of the aircraft "rice-grain" type, the reliability of which is higher than 100,000 hours.

FIG. 3 shows the lamp 20 illuminating periodically the phototransistor 21 which is connected to a circuit 22, such as a Schmitt trigger formed for instance by means of NAND logic circuits, in order to increase the steepness of the rising front of the impulses and to fix the ignition point with high accuracy.

According to another feature of the invention, the signals issuing from the Schmitt trigger are applied to a device for adjusting the ignition according to the rotary speed of the engine, the principle of which has been illustrated in FIG. 3. This adjusting device comprises in series a univibrator 23, an integrator 24, a current generator 25, an RC branch, an electronic cut-off 26 coupled to the output of the current generator, and a trigger 27 which operates as soon as the voltage supplied by the cut off 26 reaches a certain threshold.

This device fulfills the function of a conventional centrifugal ignition advance mechanism which allows more or less advance to be imparted to the ignition according to the rotary speed of the engine. In the present case, the ignition is initially adjusted for the maximum rotary speed of the engine, and the electronic adjusting device enables the ignition to be imparted a certain delay which depends upon the difference between the actual rotary speed of the engine and its maximum speed.

To this end, the impulses issuing from the Schmitt trigger are calibrated by the univibrator 23 and then integrated by the circuit 24 so as to provide a voltage which is in proportion to the rotary speed of the engine, and then are converted by the current generator 25 so as to provide a current depending upon the rotary speed of the engine, and the values of R and C are so selected as to provide a current which is in direct proportion to the rotary speed of the engine. When the electronic cut-off 26 is closed, the time after which the voltage is equal to the operating threshold of the trigger 27 depends upon C, R, and upon the current, therefore upon the rotary speed of the engine.

Figure 4:
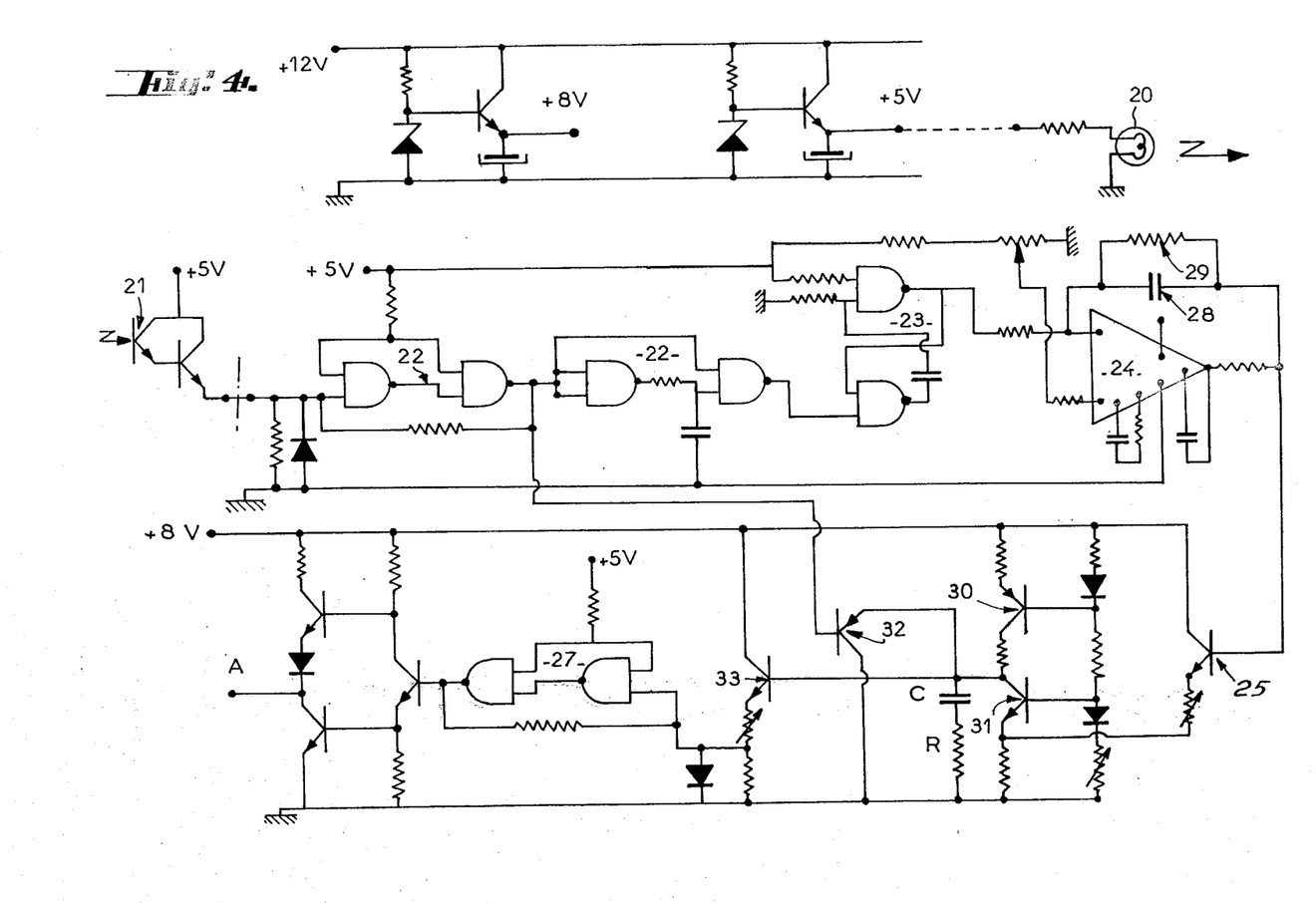
FIG. 4 is a detailed view of the device shown in FIG. 3.

In FIG. 4 is illustrated an embodiment of the device just described. This device comprises an emitter-follower-connected phototransistor 21 which operates a logic-circuit Schmitt trigger 22 followed by two other logic circuits fulfilling the function of a second Schmitt trigger, a logic-circuit univibrator 23, and an integrated circuits 24 fulfilling the function of an integrator by means of the capacity 28 and the resistance 29. At the output of the integrator is arranged the current generator 25 formed of the transistors 30 and 31, at the output of which are arranged the capacity C and the resistance R. The transistor 32, the base of which is connected to the output of the Schmitt trigger 22, fulfills the function of an electronic cut-off, and to the input of the trigger 27 formed of two logic circuits, by means of a transistor 33 fulfilling the function of a coupler. The curcuit is then connected at A to the device described in FIG. 1.

Figure 5:
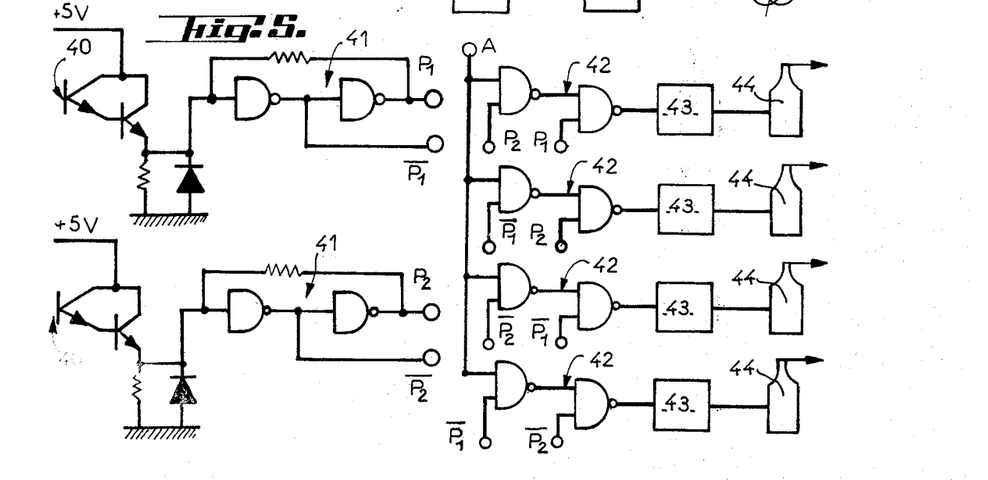
FIG. 5 is a diagrammatic view of an electronic distributor according to the invention.

Thus, as compared with the conventional ignition, the breaker and the centrifugal ignition advance are done away with and replaced by electronic devices. According to another feature of the invention, the conventional mechanical distributor may also be replaced by an electronic switching system comprising phototransistors mounted in the same manner as the phototransistor 21 which controls the ignition. In FIG. 5 is shown such an electronic switching system.

This system therefore comprises two phototransistors 40 which are emitter-follower-connected as previously and which operate the Schmitt trigger 41 which delivers an output signal P1 (respectively P2). Between the logic circuits forming the Schmitt triggers is provided an output in order to obtain the matching signal of P1, and of P2. To this control device are associated switching circuits which are equal in number to the cylinders of the engine, each of the said switching circuits comprising a switching stage 42, a power stage 43, and a coil 44 connected directly to the plug of the corresponding cylinder. Each switching stage 42 is connected to the point A of the device described in FIG. 4, and comprises two logic circuits, each having two inputs connected to the two outputs of each Schmitt trigger 41 as shown in FIG. 5.

Figure 6:
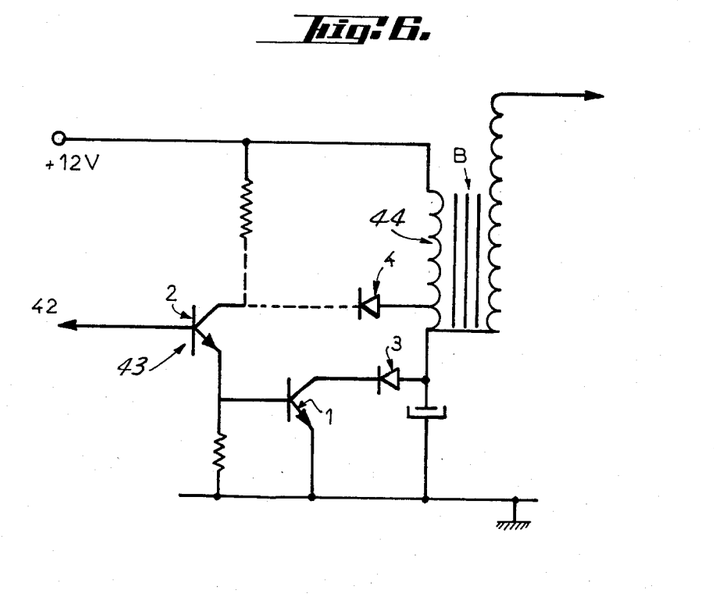
FIG. 6 is a detailed view of a portion of the distributor illustrated in FIG. 5.

The power stage 43 and the coil 44 of each switching circuit is shown more in detail in FIG. 6. It will be noted that use is made, after each switching stage 42, of the same device as that described in FIG. 1.

The electronic distributor according to the invention therefore has the drawback of requiring as many switching stages, power stages and coils as there are cylinders, but it enables the ignition of performance engines rotating at high speeds to be improved. Indeed, it enables to obtain longer coil charging times than with a conventional distributor and, therefore, an improved ignition and a greater regularity.

Figure 7:
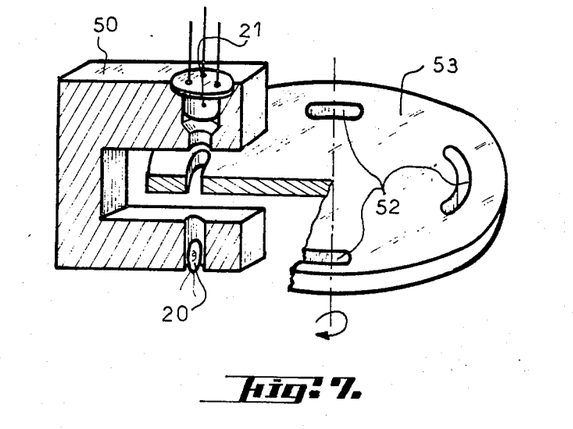
FIG. 7 is a partially sectional view of a mounting detail of a device according to the invention.

In FIG. 7 is shown a detailed embodiment of the invention, concerning a practical mounting of a phototransistor and of its illuminating lamp.

The phototransistor 21 is mounted on a support 50 shown partially in section, in which is also mounted the illuminating lamp 20 of the said phototransistor. The support 50 is in the form of a horizontal U-shaped element, and the phototransistor 21 is illuminated by the lamp 20 through openings 52 provided in a disk 53 passing between the two horizontal legs of the U-shaped support 50. The disk 53 is secured, for instance, on the drive shaft of a conventional mechanical distributor and breaker. Of course, the disk 53 is provided with a number of openings 52 equal to that of the cylinders of the engine.

Furthermore, the phototransistors 40 controlling the electric distributor according to the invention may be mounted on the same support 50 as the ignition control phototransistor 21. An entirely electronic and highly compact ignition system can thus be obtained, since the three phototransistors and their support may be housed in a case which is only slightly larger than that of a conventional Delco.

Figure 8A:
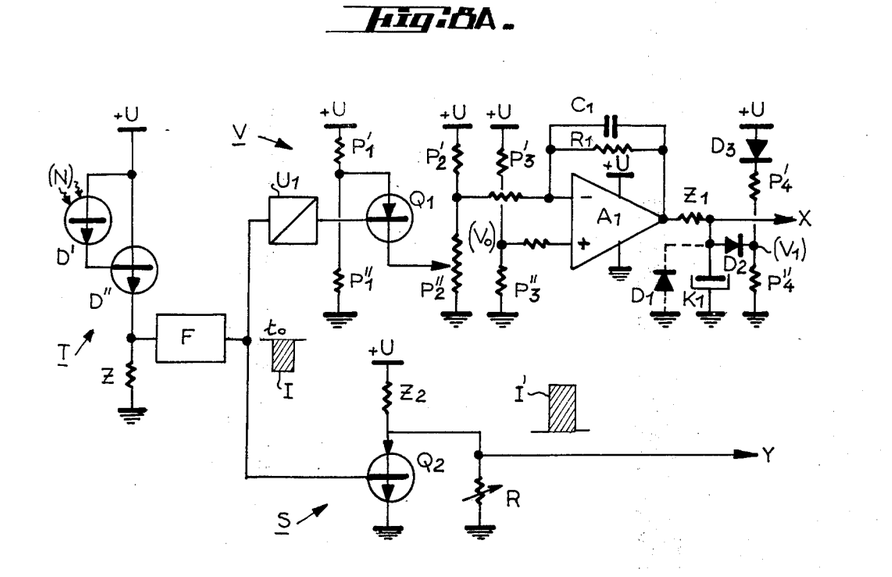
Figure 8B:
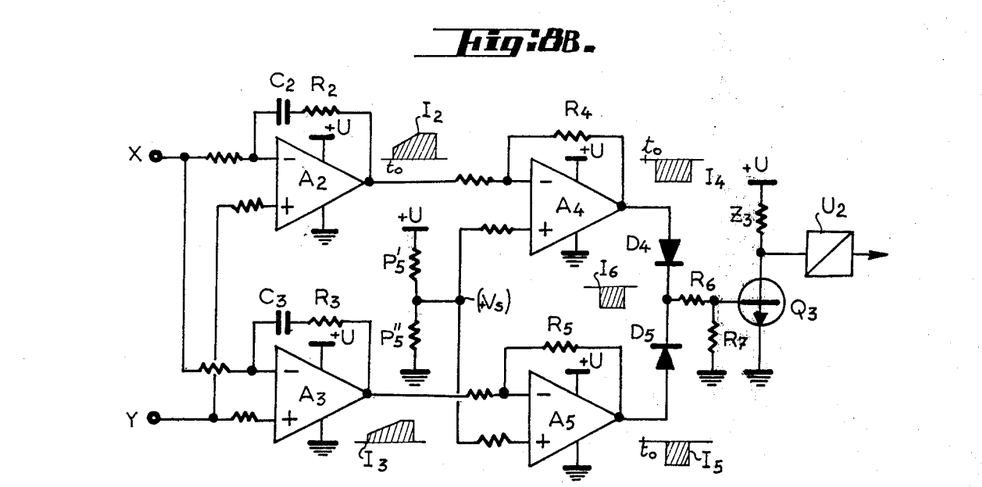

The device, the diagram of which is shown in FIG. 8 A-B, is intended to be incorporated in an electronic ignition device for an internal combustion engine according to the invention and its function is to determine the optimum value of ignition advance depending upon the rotary speed of the engine, not only upon the characteristics of the latter, but also upon considerations such as fuel economy and the composition of exhaust gases from the point of view of atmospheric pollution.

The device illustrated comprises essentially a speed sensing device T constituted by an opto-electronic transducer, an automatic speed-control circuit V and phase synchronizing circuit S shown in FIG. 8A, and also an ignition control impulse generating circuit shown in FIG. 8B.

The speed sensing device T is constituted by a phototransistor D' and an associated transistor D'' forming a Darlington circuit supplied with voltage +U and provided with a load Z. The phototransistor D' is illuminated periodically and, therefore, rendered conductive at a frequency proportional to the rotary speed N of the engine for instance by means of the perforated-disk device of FIG. 7. A shaping circuit F coupled to the resistance Z provides rectangular impulses I, the recurrent frequency of which is proportional to the rotary speed N of the engine. These impulses are applied on the one hand to the automatic speed-control circuit V, and, on the other hand, to the phase synchronizing circuit S.

Figure 9:
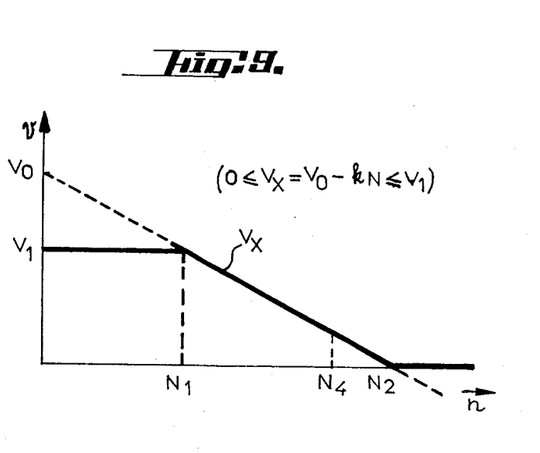
FIG. 9 is a graph illustrating the transfer characteristic of an operational amplifier incorporated in the device of FIG. 8.

The automatic speed-control circuit V comprises a univibrator U1 which, in response to each impulse I, provides an impulse of predetermined amplitude and duration to the base of a transistor Q1, the emitter of which is polarized by a voltage divider bridge P'1-P''1 supplied with voltage +U, and the collector of which is connected to the slide of potentionmeter P''2 forming with an associated resistance P'2 a second divider bridge which is also supplied with voltage +U. The neutral point of this divider bridge is connected through the medium of a protecting resistance to the other input ($-$) of an operational amplifier A1 whose imput (+) is maintained at a potential V0 by a third divider bridge P'3-P''3 which is also supplied with voltage +U. The operational amplifier A1 is provided with a feedback loop constituted by a capacity C1 and a resistance R1 interconnected in parallel. The output of this amplifier is connected to the input of an integrating circuit formed of a resistance Z1 and a capacity K1. The voltage across the capacity K1, which is necessarily positive, as symbolized by the diode D1, is limited to a value V1 by a limiting circuit comprising a diode D2 connected to the neutral point of a voltage divider bridge formed of the resistances P'4-P''4 supplied with voltage +U through the medium of a diode D3. The voltage $V_X$ at the terminal X of the automatic control circuit V therefore varies according to the law illustrated in FIG. 9, i.e., $V_X = v_0 - kN$, with $0 \leq V_X \leq V1$, this last voltage being that of the neutral point of the divider bridge P'4-P''4.

The phase synchronizing circuit S comprises essentially an inverter formed of a transistor Q2 and of a collector load Z2 supplied with voltage +U, and an attenuator formed of a simple rheostat R at the terminal of which are taken off, through the terminal Y, impulses I' the level of which is adjustable and the duration identical with that of the speed impulses I.

Figures 10A, 10B:
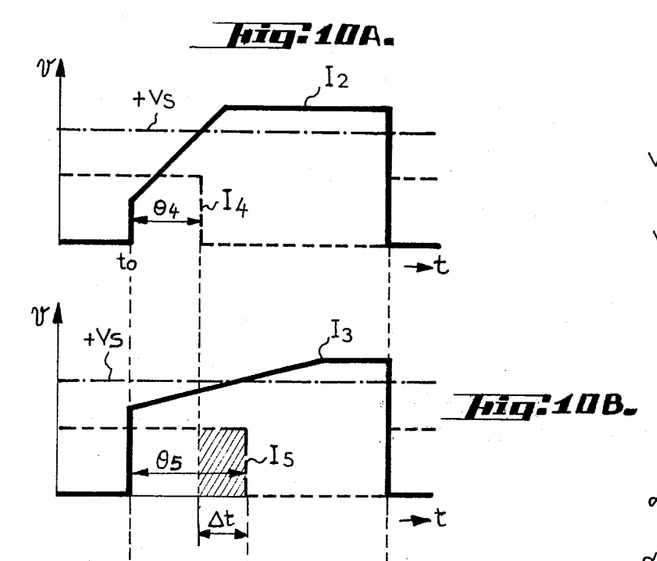
Figure 10C:
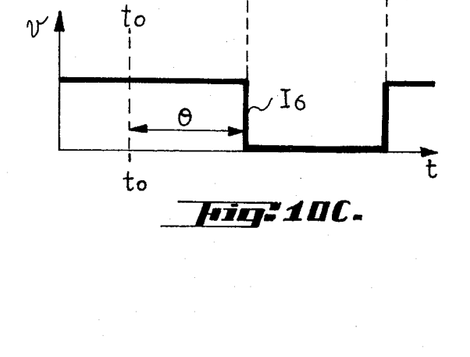

The signals available at the terminals X, Y are applied to the ignition control impulse generating circuit shown in FIG. 8B. This circuit comprises essentially two operational amplifiers A2, A3, the inputs ($-$) and (+) of which are respectively connected to the terminals X, Y, and each of which comprises a feed-back loop formed of a resistance R2, R3 in series with a capacity C2, C3, the time constants of the said feed-back loops being different. Consequently, in response to each tacho-impulse I, the operational amplifiers A2, A3 provide respectively impulses I2, I3 shown in FIGS. 10A, 10B. These impulses begin at the instant t0 with a steep front coinciding with that of the tacho-impulses I, a slope which is determined by the time constant C2.R2, C3.R3 of the feed-back loop of the amplifier concerned, and then a plateau, the level of which depends upon the polarizing voltage V0 and the rotary speed N of the engine, and ends with a steep tail coinciding with the return of the univibrator U1 to the inoperative state.

The impulses I2, I3 are respectively applied to the input ($-$) of operational amplifiers A4, A5, the inputs (+) of which are maintained at one and the same potential $+V_S$ determined by a voltage divider bridge P'5-P''5 supplied with voltage +U. Each of the amplifiers A4, A5 being provided with a feed-back loop constituted by a simple resistance R4, R5 constitutes a triggering threshold circuit which is active when the voltage applied to its input ($-$) exceeds the voltage $+V_S$ applied to its input (+). Consequently, the amplifiers A4, A5 deliver respectively the impulses I4, I5 shown in FIGS. 10A, 10B, which present, with respect to the instant t0, respective delays θ4, θ5 determined by the coincidence of the threshold voltage $+V_S$ with the slopes of the impulses I2, I3 respectively. In the case illustrated in these Figures, the front of the impulse I5 presents a delay $\Delta t$ with respect to that of the impulse I4.

The outputs of the operational amplifiers A4, A5 are interconnected through the medium of respective diodes D4, D5 having one and the same relative direction of conduction, constituting a logic gate NOR which supplies to the divider bridge formed of the resistances R6, R7 a negative impulse I6, the front of which coincides with that of the impulse I4, I5 starting most belatedly with respect to the instant $t0$. The impulses I6 is applied to the base of a transistor Q3, the collector which is supplied with voltage +U through the medium of a load Z3, from the terminals of which is taken off an output signal of the circuit, which is shaped by a univibrator U2 before being applied to the ignition control circuits described previously.

Figure 11:
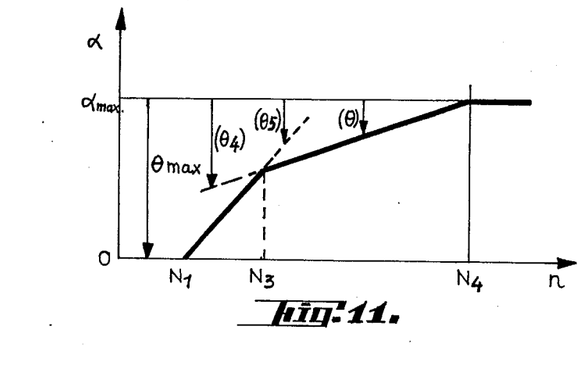
FIG. 11 is a graph illustrating the regulation characteristic of the device of FIG. 8.

The operation of the whole ignition advance adjustment device described and illustrated takes place according to the characteristic curve shown in FIG. 11.

When the engine rotates at a speed lower than a certain limit N1, the tacho-impulses I are sufficiently spaced to cause the voltage available at the output of the amplifier A1 to remain fixed by the divider bridge P'4-P''4 to its maximum value V1. Consequently, the amplifiers A2, A3 deliver output impulses, the respective amplitudes of the front and the plateau of which are such that the impulses I4, I5 provided respectively by the amplifiers A4, A5 present, with respect to the instant $t0$, a delay $\theta_{max}$ which nullifies the ignition advance $\alpha$, expressed in engine rotation degrees.

When the rotary speed of the engine exceeds the limit N1, the output voltage $V_x$ of the amplifier A1 begins to decrease, so that the front of impulses I4, I5 is shifted from the instant $t0$ corresponding to the front of the tacho-impulses I. Owing to the action of the diodes D4, D5, the transistor Q3 becomes conductive and starts the output univibrator U2 only at the moment when the two impulses I4, I5 coexist.

Owing to the different time constants of the feedback loops of the amplifiers A2, A3 and to the influence of the output voltage of the amplifier A1 on the shape of impulses I2, I3, the order of succession of the impulses I4, I5 is inverted at a certain speed N3, thus leading to a modification of the loss in the regulation characteristic of the device, as shown in FIG. 11.

This means, for instance, that between the speed N1 and the speed N3 the ignition delay $\theta$ decreases from its initial maximum value $\theta_{max}$ like the delay $\theta_5$ of the impulse I5, determined by the time constant C3 R3 of the amplifier A3, and that above the speed N3, the ignition delay decreases like the delay $\theta_4$ of the impulses I4, determined by the time constant C2.R2.

Lastly, from a certain speed N4, the height of the front of the two impulses I2, I3 exceeds the threshold voltage $V_s$ of the amplifiers A4, A5, so that the delay $\theta$ is cancelled and, therefore, the ignition advance remains fixed at its maximum value $\alpha_{max}$.

It will be noted that all the circuits described are fed with respect to the ground with one and the same voltage +U, which is advantageously so selected as to be much lower than the minimum load voltage of the vehicle battery, for instance equal to 5V.

Figure 12:
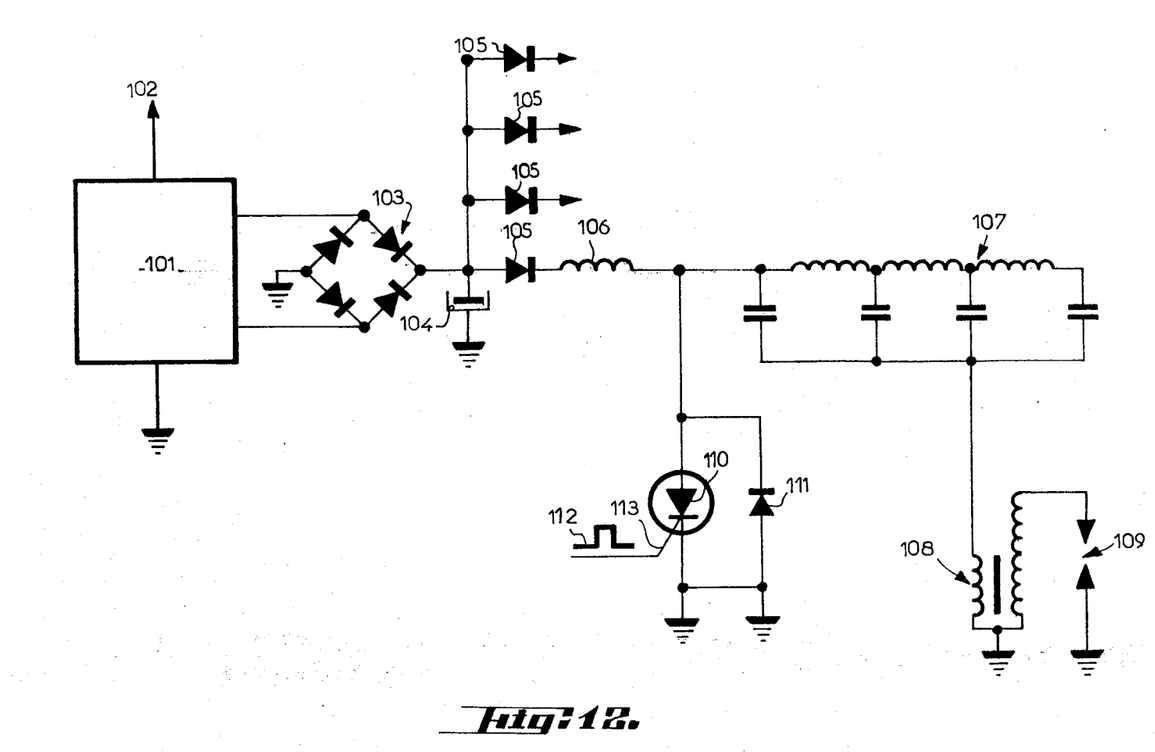
FIG. 12 diagrammatically shows another embodiment of a power stage according to the invention.

The invention also relates to an improved power stage described in FIG. 12.

The requirements put forth by motor-car makers and, simultaneously, the new laws concerning the pollution caused by exhaust gases, are such that the ignition devices must meet highly stringent conditions, especially with respect to the duration of the spark provided to the plug, the value of the very high voltage supplied to this plug and its rising time. In order to obtain as good a combustion as possible, it has been necessary to determine the critical values for the duration of the spark, the value of the voltage applied to the electrodes of the plug, and of the rising time of this very high ignition voltage, all these values being such that the devices of the prior art are unable to withstand the corresponding stresses or to meet such requirements.

According to the variant of FIG. 12, each power stage associated with the plug corresponding to a cylinder is fed by a converter 101 which converts the d.c. voltage provided by the battery 102 of the vehicle into a common a.c. voltage.

A rectifier bridge 103 formed of diodes is mounted at the output of the converter 101 in order to provide d.c. voltage from the a.c. voltage supplied by the convertor. An electrochemical capacitor 104 connects the output of the rectifier bridge 103 to the ground, and a diode 105 mounted in series with a choke 106 connects the output of the rectifier bridge 103 to a delay line 107 forming a buffer circuit. The coil 108 connects the said delay line to a plug 109 mounted in the corresponding cylinder.

An active switching element, such as a thyristor 110, is connected in parallel between the choke 106 and the delay line 107 and connects the power stage with a corresponding logic-circuit switching stage, not shown in FIG. 12. The cathode of the said thyristor is connected to the ground, its anode is connected to the power stage and its gate is connected to the switching logic-circuit. A diode 111, the direction of conduction of which is opposite to that of the thyristor 110, is connected in parallel with the latter between the ground and the anode of the said thyristor.

The power stage described in FIG. 12 operates as follows.

An impulse 112 delivered by the associated switching stage is supplied to the gate 113 of the thyristor. The latter then becomes conductive, and the voltage provided by the convertor 101 and stored in the delay line 107 abruptly passes through the primary winding of the coil 108, during a time which is, precisely, determined by the delay line 107. The voltage induced in the secondary winding of the coil 108 produces a spark between the electrodes of the plug 109, the rising front of which is very steep and its duration well-determined.

At the end of the impulse 112, the thyristor 110 is non-conductive, the coke 106 serving to protect the convertor for the duration of the impulse 112, preventing the latter from being connected to the ground.

By way of example, the voltage provided by the battery 102 of the vehicle may vary between 7 and 15 volts, the d.c.-a.c. converter 101 supplying to the output of the rectifier bridge 103 a voltage on the order of 200 volts, the diode 105 and the choke 106 then forming a voltage doubler circuit enabling a voltage slightly lower than 400 volts to be obtained at the input of the delay line 107, so as to supply through the secondary winding of the coil 108 a very high voltage, higher than 15,000 volts for a plug resistance of 50 k.ohms, with a rising time less than 5 microseconds. The duration of the spark between the electrodes of the plug is then greater than 0.4 milliseconds, corresponding to a spark energy on the order of 500 millijoules, i.e., an energy about 20 times greater than those obtained in the known devices of the prior art.

The convertor used supplies the coil with a relatively high d.c. voltage, much higher than the d.c. voltage usually supplied to the said coil, thus enabling to obtain, at the plugs, spark energies much greater than those provided by the devices of the prior art.

Moreover, the use of the coil 108 enables notably leakage and stray capacity to be reduced, thus allowing a very tight coupling and an improved aptitude to transient states to be ensured.

Of course, the invention is by no means limited to the forms of embodiment described and illustrated, which have been given by way of example only. In particular, it comprises all the means constituting technical equivalents to the means described as well as their combinations, should the latter be carried out according to the spirit of the invention.

What is claimed is:

1. An electronic ignition system for an internal combustion engine having a plurality of spark plugs, comprising sensing means for providing a train of control pulses having a recurrent rate proportional to actual engine speed; low-voltage electronic analog processing circuit means receiving said control pulse train and including shaping circuit means for shaping said control pulses into a sequence of square pulses having a predetermined width, and timing circuit means for controlling ignition spark delay by controlling the recurrent rate of said sequence of square pulses in accordance with the difference between the actual engine speed and a predetermined engine speed, power circuit means coupled to the output of said processing circuit means and responsive to said sequence of square pulses for providing high-voltage spark plug control pulses adapted to ignite said spark plugs; and distributing circuit means coupled to the output of said processing circuit means and responsive to the actual engine speed for distributing said high voltage spark plug control pulses to said spark plugs, and wherein said timing circuit comprises at least one operational amplifying means having first and second input terminals and an output terminal, a feed-back loop coupling the second input terminal to the output terminal of the operational amplifying means and comprising a resistance element and a capacitance element in series combination, an integrating means providing a d.c. voltage which varies as in inverse function of the recurrent rate of said sequence of shaped pulses derived from said sensing means, the first input terminal of said operational amplifying means being coupled through an amplitude adjusting circuit to said sensing means, the second input terminal being coupled through said integrating means to the sensing means, and a threshold trigger circuit having an input connected to the output terminal of said operational amplifying means and responsive to each shaped pulse provided by the sensing means for generating an ignition spark delay control pulse which is delayed from said shaped pulse by a time interval which is inversely related to the delay of the engine speed.

2. A system as in claim 1, wherein said integrating means comprises a second operational amplifier having first and second input terminals and an output terminal and provided with a feed-back loop including a resistance element and a capacitance element in parallel relationship, the first input terminal being coupled to a source of reference voltage and the second input terminal being coupled to the output of said shaping means, and the output terminal of said second operational amplifier being coupled to an integrating circuit.

3. A system as in claim 1, wherein said amplitude limiting means is associated with said integrating means for determining the maximal value of the output d.c. voltage provided by the integrating means.

4. A system as in claim 1, wherein said threshold trigger circuit includes an additional operational amplifier having a first input terminal coupled to a source of reference threshold voltage, a second input terminal coupled to the output of said at least one operational amplifying means and an output terminal coupled through a feed-back resistance means to said second input terminal.

5. A system as in claim 4, and wherein said timing circuit further comprises a second operational amplifying means similar to said first one and coupled as said first one, the time constant of the feed-back loops differing from each other, and wherein each said first and second operational amplifying means has its own respective threshold trigger circuit, the outputs of said threshold trigger circuits being interconnected through respective forward-biased diodes.

6. A system as in claim 5 and wherein said source of reference threshold voltage supplies a same voltage for the two operational amplifiers in said threshold trigger circuits.

7. A system as in claim 1 and wherein said system is adapted to be powered with a voltage lower than the minimal charge voltage which may be generated by the battery of the vehicle containing said internal combustion engine.

8. A system as in claim 1, and wherein said electronic processing circuit means comprises a plurality of output terminals, corresponding to said plurality of spark plugs, said distributing circuit means has a corresponding plurality of switching output stages, and said power circuit means comprises a d.c. to a.c. and a.c. to d.c voltage step-up converter for converting the d.c. voltage generated by the battery of a vehicle containing said engine into a high d.c. voltage, said converter having a corresponding plurality of output terminals; a corresponding plurality of chokes each respectively coupled to the latter output terminals; a corresponding plurality of delay lines operating as buffer circuits and having first and second input terminals and an output terminal, the first terminal of each delay line being connected to an end of its respective choke; a corresponding plurality of ignition transformers each coupled respectively to an output terminal of its delay lines; and said switching stages each respectively coupled to said second input terminals of the delay lines for controlling the ignition of each spark plug.

9. A system as in claim 8 and wherein said converter comprises a full wave bridge-rectifier.

10. A system as in claim 8, and wherein each of said chokes co-operate with a rectifying element so as to form a voltage doubling circuit.

11. A system as in claim 8 and wherein each of said switching stages includes a controlled unidirectional conduction device having first, second and third terminals, the first terminal being connected to said second input terminal of its respective delay line, the second terminal being grounded and the third terminal being connected to the corresponding output terminal of said electronic processing circuit.

12. A system as in claim 11 and wherein said controlled unidirectional conduction device is a thyristor of which said first, second and third terminals are respectively the anode, cathode and control gate electrodes thereof.

13. A system as claimed in claim 11, wherein said controlled unidirectional conduction device is shunted by an opposite-biased unidirectional conduction device.

14. A system as in claim 1 and further comprising electronic cut-off means coupled between said processing circuit means and said power circuit means for decoupling said power circuit thereby providing well shaped electric pulses.

15. A system as in claim 14 and further comprising a trigger circuit controlling said electronic cut-off means.

16. A system as in claim 1, wherein said sensing means includes a rotatable disc having a plurality of apertures provided at equidistant intervals at the periphery thereof and rotated at a speed representative of the engine speed, a light source mounted adjacent one side of said disc near the periphery thereof and a phototransistor disposed adjacent the opposite side of the disc and in general alignment with said light source through successive ones of said apertures.

17. A system as in claim 16, wherein said sensing means further includes a Schmitt trigger for shaping the output pulse provided by said sensing means.

18. A system as in claim 1, wherein said electronic processing circuit means comprises an output terminal and wherein said distributing circuit means comprises a plurality of electronic switching stages corresponding to said plurality of spark plugs each stage having input terminals and an output terminal, an input terminal of each switching stage being coupled to the output terminal of the electronic processing circuit means, and detecting means for supplying distributing control signals at a rate representative of the actual engine speed to the other of said input terminals of the switching stages.

19. A system as in claim 18, wherein said sensing means includes a rotatable disc having a plurality of apertures provided at equidistant intervals at the periphery thereof and rotated at a speed representative of the engine speed, a light source mounted adjacent one side of said disc near the circumferential periphery thereof and a phototransistor disposed adjacent the opposite side of the disc and in general alignment with said light source through successive ones of said apertures, and wherein said detecting means includes detecting phototransistors and Schmitt triggers associated therewith, said detecting phototransistors being disposed adjacent said opposite side of said disc in said sensing means and in general alignment with said light source through successive ones of said apertures.

20. An electronic ignition system for an internal combustion engine having a plurality of spark plugs, comprising sensing means for providing a train of control pulses having a recurrent rate proportional to actual engine speed; shaping circuit means for shaping said control pulses into a sequence of rectangular pulses having a predetermined width; and timing circuit means for controlling ignition spark delay by controlling the recurrent rate of said sequence of rectangular pulses in accordance with the difference between the actual engine speed and a predetermined engine speed, said timing circuit means comprising integrating means providing a d.c. voltage which varies as a function of the recurrent rate of said sequence of said shaped pulses applied thereto, amplifying means having a resistance element and a capacitance element in series combination for providing a time-constant circuit, and a threshold trigger circuit having an input connected to the output terminal of said amplifying means and responsive to each shaped pulse provided by the sensing means for generating an ignition spark delay control pulse which is delayed from said shaped pulse by a time interval which is inversely related to the engine speed; power circuit means responsive to the signals from said timing circuit means for providing high-voltage spark plug control pulses adapted to ignite said spark plugs; and distributing circuit means coupled to the signals from said timing circuit means and responsive to the actual engine speed for distributing said high voltage spark plug control pulses to said spark plugs.

21. A system as in claim 20, wherein said amplifying means comprises at least one operational amplifying means having first and second input terminals and an output terminal, a feed-back loop coupling the second input to the output terminal of the operational amplifying means and comprising said time-constant circuit, said integrating means providing a d.c. voltage which varies as in inverse function of the recurrent rate of said sequence of said shaped pulses, the first input terminal of said operational amplifying means being coupled through an amplitude adjusting circuit to said sensing means, the second input terminal being coupled through said integrating means to the sensing means.

22. A system as in claim 20, wherein said amplifying means comprises a voltage to current converter having an output connected to said time-constant circuit, said integrating means providing a d.c. voltage which varies proportionally to the recurrent rate of said sequence of said shaped pulses, and wherein said threshold trigger circuit includes a cut-off circuit and a trigger circuit which has a given threshold value and provides said ignition spark delay control pulse when said threshold value is reached.

* * * * *